(12) United States Patent
Ben Henda et al.

(10) Patent No.: US 12,003,494 B2
(45) Date of Patent: Jun. 4, 2024

(54) NETWORK SLICE AUTHENTICATION

(71) Applicant: Telefonaktiebolaget LM Ericsson (publ), Stockholm (SE)

(72) Inventors: Noamen Ben Henda, Stockholm (SE); Monica Wifvesson, Lund (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 393 days.

(21) Appl. No.: 17/422,767

(22) PCT Filed: Jan. 21, 2019

(86) PCT No.: PCT/EP2019/051334
§ 371 (c)(1),
(2) Date: Jul. 14, 2021

(87) PCT Pub. No.: WO2020/151798
PCT Pub. Date: Jul. 30, 2020

(65) Prior Publication Data
US 2022/0070157 A1 Mar. 3, 2022

(51) Int. Cl.
*H04L 9/40* (2022.01)
(52) U.S. Cl.
CPC .............. *H04L 63/08* (2013.01); *H04L 63/20* (2013.01)
(58) Field of Classification Search
CPC ...... H04L 63/08; H04L 63/20; H04W 12/041; H04W 12/06
See application file for complete search history.

(56) References Cited

U.S. PATENT DOCUMENTS

2021/0289351 A1* 9/2021 Ferdi .................... H04W 12/02

FOREIGN PATENT DOCUMENTS

| WO | 2018137873 A1 | 8/2018 |
| WO | 2018236819 A1 | 12/2018 |

OTHER PUBLICATIONS

International Search Report and Written Opinion dated Sep. 13, 2019 for International Application No. PCT/EP2019/051334 filed Jan. 21, 2019, consisting of 12-pages.

(Continued)

*Primary Examiner* — Beemnet W Dada
(74) *Attorney, Agent, or Firm* — Weisberg I.P. Law, P.A.

(57) ABSTRACT

Arrangements for network slice isolation. A method is performed by a terminal device. The method includes determining to shift from accessing a first service using a current network slice to accessing a second service using a target network slice. Network access to the current network slice is handled by a source Access Management Function. Network access to the target network slice is handled by a target Access Management Function. The method includes performing a slice authentication procedure in response thereto. During the authentication procedure a mutual secret is shared between the terminal device and the target Access Management Function. The method includes creating a security context for the target network slice based on the mutual secret. The method includes activating the security context, thereby security isolating the target network slice from the source Access Management Function.

20 Claims, 9 Drawing Sheets

(56) References Cited

OTHER PUBLICATIONS

3GPP TSG SA WG3 (Security) Meeting #87 S3-171591 revision of S3-171283; Title: Update of solution #1.36 for SEAF realization via AMF (KI #1.2); Agenda Item: 8.3.1; Source: Ericsson; Document for: Approval; Date and Location: May 15-19, 2017, Ljubljana, Slovenia, consisting of 4-pages.
3GPP TSG SA WG3 (Security) Meeting #94 S3-190272 revision of S3-19xabc; Title: Solution for key separation based on slice authentication keys; Agenda Item: 8.11; Source: Ericsson; Document for: Approval; Date and Location: Jan. 28-Feb. 1, 2019, Kochi, India, consisting of 3-pages.
3GPP TR 23.740 V16.0.0; 3rd Generation Partnership Project; Technical Specification Group Services and System Aspects; Study on Enhancement of Network Slicing (Release 16), Dec. 2018, consisting of 70-pages.
3GPP TS 33.501 V15.3.1; 3rd Generation Partnership Project; Technical Specification Group Services and System Aspects; Security architecture and procedures for 5G system (Release 15), Dec. 2018, consisting of 181-pages.
3GPP TS 23.502 V15.4.0; 3rd Generation Partnership Project; Technical Specification Group Services and System Aspects; Procedures for the 5G System; Stage 2 (Release 15), Dec. 2018, consisting of 346-pages.

\* cited by examiner

NETWORK SLICE AUTHENTICATION

CROSS-REFERENCE TO RELATED APPLICATIONS

This application is a Submission Under 35 U.S.C. § 371 for U.S. National Stage Patent Application of International Application Number: PCT/EP2019/051334, filed Jan. 21, 2019 entitled "NETWORK SLICE AUTHENTICATION," the entirety of which is incorporated herein by reference.

TECHNICAL FIELD

Embodiments presented herein relate to methods, a terminal device, an Access Management Function (AMF), computer programs, and a computer program product for network slice isolation.

BACKGROUND

In communication networks, there may be a challenge to obtain good performance and capacity for a given communication protocol, its parameters and the physical environment in which the communication network is deployed.

For example, some services result that a terminal device served by the communication network changes from being handled by one AMF (hereinafter denoted source AMF) to being handled by another AMF (hereinafter denoted target AMF). When such change of AMF takes place, and based on a local operator policy, the source AMF may derive a new AMF key for the target AMF and the target AMF may trigger a new authentication run for the terminal device. In case the source AMF sends the AMF key without changing it, the previous communication for the terminal device based on that key is not shielded from the target AMF. This is because the AMF key is used as the basis for deriving the Access Stratum key and all subsequent keys used to protect the signaling and the user data over the air interface. In other terms, if an attacker gets hold of an AMF key then all the subsequent keys derived from, or based on, that keys are compromised.

In case the source AMF derives a new AMF key for the target AMF, the target AMF cannot recover the key used between the terminal device and the source AMF. This is due to the cryptographic property of the key derivation function used for deriving keys. The key derivation function has the property of being a one-way function, meaning that the input cannot be easily determined from the output. Therefore, the previous communication based on the key used between the source AMF and the terminal device is shielded from the target AMF. This is how backward security is realized.

In case the target AMF triggers a new authentication run, then this refreshes the whole key hierarchy and totally shields the communication between the terminal device and the communication network from the source AMF. This is because the resulting AMF key used by the target AMF would be derived based on a key not known to the source AMF. This would be the long-term key Kin the Authentication and Key Agreement (AKA) authentication credentials only shared between the terminal device and the Unified Data Management (UDM) function in the home Public Land Mobile Network (PLMN). This is how forward security is realized.

In the document 3GPP TS 33.501 "Security architecture and procedures for 5G System", version 15.3.1, includes requirements for backward and forward security during AMF change. As defined in this document, backward security is the property that for an entity with knowledge of $K_n$, it is computationally infeasible to compute any previous $K_{n-m}$ (m>0) from which $K_n$ is derived, and forward security is the property that for an entity with knowledge of $K_m$ that is used between that entity and a second entity, it is computationally infeasible to predict any future $K_{m+n}$ (n>0) used between a third entity and the second entity.

As described in 3GPP Technical Report (TR) 23.740 "Study on Enhancement of Network Slicing", version 16.0.0, network slicing is a specific form of virtualization that allows multiple logical networks to run on top of a shared physical network infrastructure. In clause 5.1 of this document is discussed possible support of Mutually Exclusive Access to Network Slices (MEANS). Accordingly, the terminal device might be restricted to one of two modes of operations. For example, a terminal device for a Public Safety service might be either in an off-duty mode or in an on-duty mode but not simultaneously in both modes. Such a terminal device, when in on-duty mode, can be directed to a dedicated Public Safety network slice while when in off-duty mode, it is directed only to a mainstream network slice. Another example is a terminal device for a factory service that is restricted to an on-operation mode or a maintenance mode. Only when in the on-operation mode the terminal device gets access to a special network slice tuned for low latency and high reliability.

Changing between network slices might result in change of AMF for the terminal device. Whilst the concept of network slicing might increase performance and resource utilization, there might thus be deployment aspects related to tenancy and ownership that require further strengthening the access restriction to prevent access to the signaling and user data communicated between the terminal device and such mutually exclusive slices. One example is a deployment scenarios where the mutually exclusive network slices are controlled, or owned, by tenants that are not business partners or that have conflicting interests, e.g. are competitors, etc.

Relying on existing mechanism that shields the communication between the terminal device and a new network slice from any previous function or network node with which the terminal device communicated previously when connected to another network slice would require an additional primary authentication run involving the Home PLMN on top of the network slice authentication. This might be acceptable, but it is not efficient.

Hence, there is still a need for an improved shielding of the communication for a terminal device in the context of network slices.

SUMMARY

An object of embodiments herein is to provide efficient shielding of the communication for a terminal device in the context of network slices.

According to a first aspect there is presented a method for network slice isolation. The method is performed by a terminal device. The method comprises determining to shift from accessing a first service using a current network slice to accessing a second service using a target network slice. Network access to the current network slice is handled by a source Access Management Function. Network access to the target network slice is handled by a target Access Management Function. The method comprises performing a slice authentication procedure in response thereto. During the authentication procedure a mutual secret is shared between the terminal device and the target Access Management Function. The method comprises creating a security context for the target network slice based on the mutual secret. The method comprises activating the security context, thereby security isolating the target network slice from the source Access Management Function.

According to a second aspect there is presented a terminal device for network slice isolation. The terminal device comprises processing circuitry. The processing circuitry is configured to cause the terminal device to determine to shift from accessing a first service using a current network slice to accessing a second service using a target network slice. Network access to the current network slice is handled by a source Access Management Function. Network access to the target network slice is handled by a target Access Management Function. The processing circuitry is configured to cause the terminal device to perform a slice authentication procedure in response thereto. During the authentication procedure a mutual secret is shared between the terminal device and the target Access Management Function. The processing circuitry is configured to cause the terminal device to create a security context for the target network slice based on the mutual secret. The processing circuitry is configured to cause the terminal device to activate the security context, thereby security isolating the target network slice from the source Access Management Function.

According to a third aspect there is presented a terminal device for network slice isolation. The terminal device comprises a determine module configured to determine to shift from accessing a first service using a current network slice to accessing a second service using a target network slice. Network access to the current network slice is handled by a source Access Management Function. Network access to the target network slice is handled by a target Access Management Function. The terminal device comprises an authentication module configured to perform a slice authentication procedure in response thereto. During the authentication procedure a mutual secret is shared between the terminal device and the target Access Management Function. The terminal device comprises a create module configured to create a security context for the target network slice based on the mutual secret. The terminal device comprises an activate module configured to activate the security context, thereby security isolating the target network slice from the source Access Management Function.

According to a fourth aspect there is presented a computer program for network slice isolation. The computer program comprises computer program code which, when run on processing circuitry of a terminal device, causes the terminal device 200 to perform a method according to the first aspect.

According to a fifth aspect there is presented method for network slice isolation. The method is performed by a target Access Management Function. The method comprises obtaining an indication that the terminal device has determined to shift from accessing a first service using a current network slice to accessing a second service using a target network slice. Network access to the current network slice is handled by a source Access Management Function. Network access to the target network slice is handled by the target Access Management Function. The method comprises obtaining, as output from a slice authentication procedure, a mutual secret that is shared between the terminal device and the target Access Management Function. The slice authentication procedure has been performed with the terminal device. The method comprises activating a created security context for the target network slice based on the mutual secret, thereby security isolating the target network slice from the source Access Management Function.

According to a sixth aspect there is presented an Access Management Function for network slice isolation. The Access Management Function acting as a target Access Management Function and comprises processing circuitry. The processing circuitry is configured to cause the Access Management Function to obtain an indication that the terminal device has determined to shift from accessing a first service using a current network slice to accessing a second service using a target network slice. Network access to the current network slice is handled by a source Access Management Function. Network access to the target network slice is handled by the target Access Management Function. The processing circuitry is configured to cause the Access Management Function to obtain, as output from a slice authentication procedure, a mutual secret that is shared between the terminal device and the target Access Management Function. The slice authentication procedure has been performed with the terminal device. The processing circuitry is configured to cause the Access Management Function to activate a created security context for the target network slice based on the mutual secret, thereby security isolating the target network slice from the source Access Management Function.

According to a seventh aspect there is presented an Access Management Function for network slice isolation. The Access Management Function acts as a target Access Management Function. The Access Management Function comprises an obtain module configured to obtain an indication that the terminal device has determined to shift from accessing a first service using a current network slice to accessing a second service using a target network slice. Network access to the current network slice is handled by a source Access Management Function. Network access to the target network slice is handled by the target Access Management Function. The Access Management Function comprises an obtain module configured to obtain, as output from a slice authentication procedure, a mutual secret that is shared between the terminal device and the target Access Management Function. The slice authentication procedure has been performed with the terminal device. The Access Management Function comprises an activate module configured to activate a created security context for the target network slice based on the mutual secret, thereby security isolating the target network slice from the source Access Management Function.

According to an eight aspect there is presented a computer program for network slice isolation. The computer program comprises computer program code which, when run on processing circuitry of an Access Management Function acting as a target Access Management Function, causes the Access Management Function to perform a method according to the fifth aspect.

According to a ninth aspect there is presented a computer program product comprising a computer program according to at least one of the fourth aspect and the eight aspect and a computer readable storage medium on which the computer program is stored. The computer readable storage medium could be a non-transitory computer readable storage medium.

Advantageously these methods, these terminal devices, these Access Management Functions, these computer programs, and this computer program product provide efficient shielding of the communication for a terminal device in the context of network slices.

Advantageously these methods, these terminal devices, these Access Management Functions, these computer programs, and this computer program product avoid signaling and computational overhead of an additional primary authentication involving the home PLMN.

Advantageously these methods, these terminal devices, these Access Management Functions, these computer programs, and this computer program product limit the effect of a session (NAS or AS) key compromise, e.g. due to a key leakage, to one network slice at a time. That is, when the terminal is redirected to another mutually exclusive network slice, the new AS and NAS keys are not compromised.

Advantageously, in some embodiments, the effect of the slice authentication credential key compromise is limited, should such credential be in the control of a different domain than the operator network domain.

Advantageously these methods, these terminal devices, these Access Management Functions, these computer programs, and this computer program product allow for reuse of existing mechanisms and procedures for session (NAS and AS) key activation.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
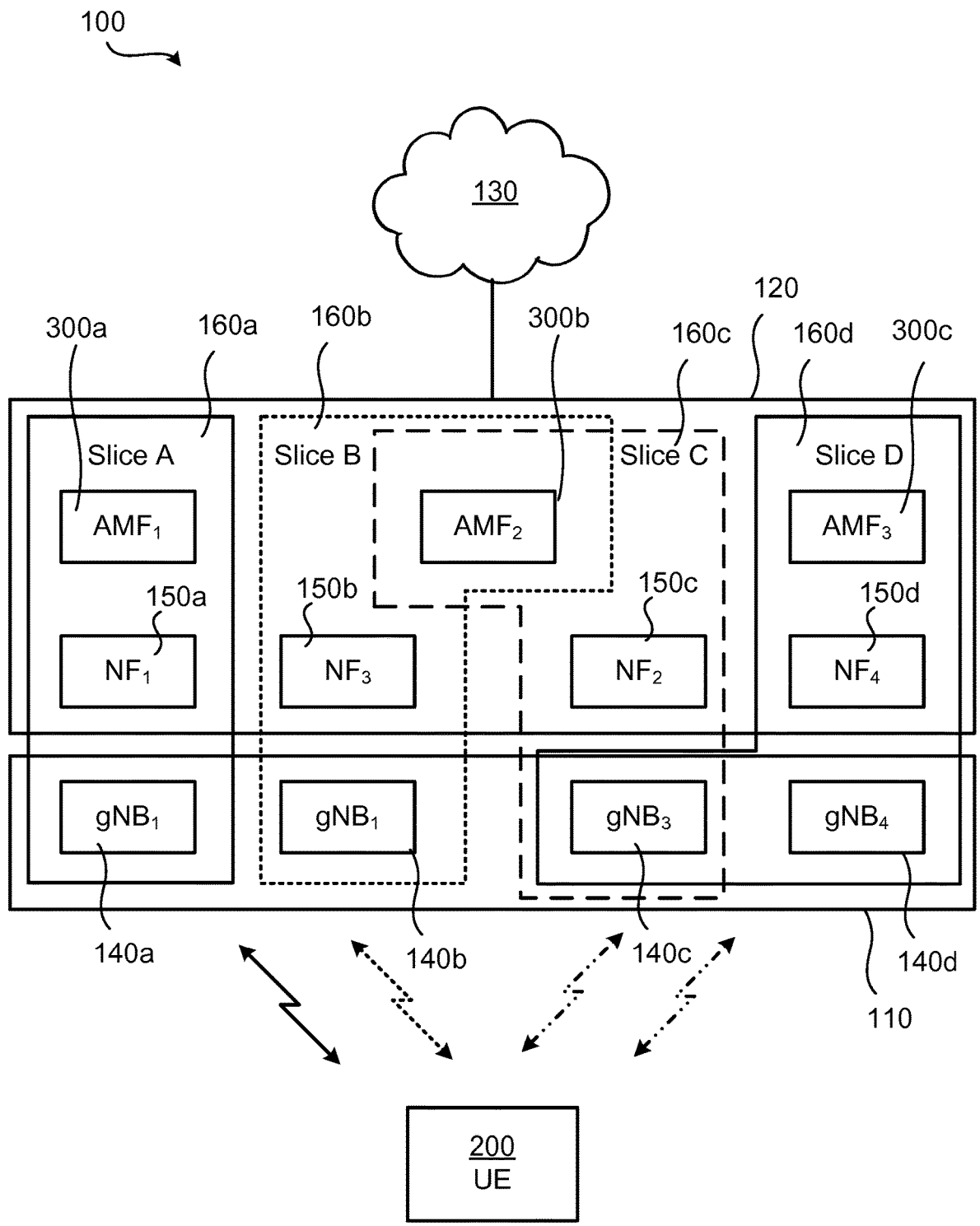
FIG. 1 is a schematic diagram illustrating a communication network according to embodiments.

FIG. 1 is a schematic diagram illustrating a communication network 100 where embodiments presented herein can be applied. The communication network 100 comprises a radio access network 110, a core network 120, and packet based service data network 130.

The radio access network 110 comprises radio access network nodes 140a, 140b, 140c, 140d in FIG. 1 exemplified by $gNB_1$, $gNB_2$, $gNB_3$, that each could be any of a radio base station, base transceiver station, node B (NB), evolved node B (eNB), access point, access node, or gNB. The radio access network 110 is configured to provided network access to terminal devices, as represented by terminal device 200. The terminal device 200 that could be any of a portable wireless device, mobile station, mobile phone, handset, wireless local loop phone, user equipment (UE), smartphone, laptop computer, tablet computer, wireless modem, wireless sensor device, or Internet of Things (IoT) device.

The radio access network 110 and the core network 120 are divided into mutually exclusive network slices 160a, 160b, 160c, 160d, in FIG. 1 exemplified by network slice A, network slice B, network slice C, and network slice D. Each network slice 160a, 160b, 160c, 160d comprises its own one or more network functions 150a, 150b, 150c, 150d, in FIG. 1 exemplified by $NF_1$, $NF_2$, $NF_3$. Further, each network slice 160a, 160b, 160c, 160d has an AMF 300a, 300b, 300c, in FIG. 1 exemplified by $AMF_1$, $AMF_2$, $AMF_3$. Two or more network slices 160a, 160b, 160c, 160d might share the same AMF. Additionally or alternatively there might be network slices 160a, 160b, 160c, 160d having their own AMF.

FIG. 1 illustrates a potential deployment scenario of an operator core network containing several mutually exclusive network slices and the allocation of the different network functions to the network slices. All the network slices in the figure are mutually exclusive in the sense that the terminal device 200 cannot access two or more of the network slices simultaneously. However, the network slices do share some of the functions while might have their own dedicated functions. For example, network slice A does not share any function with the other network slices. Network slice B and network slice C has a common AMF and network slice D shares some of the radio access network nodes ($gNB_3$) with network slice C.

As disclosed above there is a need for an improved shielding of the communication for a terminal device 200 in the context of network slices 160a, 160b, 160c, 160d.

In at least some of the herein disclosed embodiments it is assumed that a key, or other type of shared secret, is generated during an authentication procedure for network slice access between the terminal device 200 and the communication network 100. That is, a successful authentication procedure runs result in the establishment of a shared secret key between the terminal device 200 and the communication network 100. Non-limiting examples of authentication procedures that could be used for this purpose are: EAP Transport Layer Security (EAP-TLS) or EAP Pre-Shared Key (EAP-PSK), and EAP Authentication and Key Agreement prime (EAP-AKA'), where EAP is short for Extensible Authentication Protocol.

In the Release 15 of the suite of 5G telecommunication system standards as specified in aforementioned document 3GPP TS 33.501, the AMF assumes the role of the SEcurity Anchor Function (SEAF). During the early phases of the security design of the 5G telecommunication systems, it was assumed that the SEAF is the entity in the Visited PLMN that receives the anchor key KSEAF following a successful run of the access authentication procedure between the terminal device 200 and the Home PLMN. The anchor key would then be at the root of the key hierarchy used for non-access stratum (NAS) and access stratum (AS) access at the Visited PLMN and would also avoid the need for a future authentication run involving the Home PLMN should the terminal device 200 be still active in the same Visited PLMN. During the conclusion of the study phase, it was decided to collocate the AMF and the SEAF entities. In the present disclosure, the function names AMF and SEAF are used interchangeably to refer to one and the same entity, assuming the functionality of both the SEAF and the AMF.

According to at least some of the herein disclosed embodiments there is provided key separation at AMF key level, i.e. $K_{AMF}$. In the scenario of FIG. 1, when the terminal device 200 accesses network slice B immediately after network slice A, a new $K_{AMF}$ could be derived so that any communication between the terminal device 200 and network slice B would be protected shielded from functions in network slice A. For example, a potential key compromise in $AMF_1$ or $gNB_1$ that could have occurred when the terminal device 200 was accessing network slice A, will not affect the security of the communication between the terminal device 200 and network slice B. Providing key separation at the AMF key level will also provide key separation at the AS key level since AS keys are derived from the AMF key.

In general terms, the level of separation differs depending on what functions are shared between the network slices. In the illustrative example of FIG. 1, network slice B and network slice C share the AMF ($AMF_2$). Separation here is realized in time rather than space. More precisely, a potential key leakage during the time the terminal device 200 was accessing network slice B will not impact the security of communication between the terminal device 200 and network slice C. Key separation is also realized at the AS level. More precisely, a compromise of $gNB_2$ would not impact security of the communication between the terminal device 200 and $gNB_3$. However, in the extreme case that the shared AMF is compromised, key separation would not help.

The embodiments disclosed herein thus relate to mechanisms for network slice isolation. In order to obtain such mechanisms there is provided a terminal device 200, a method performed by the terminal device 200, a computer program product comprising code, for example in the form of a computer program, that when run on processing circuitry of the terminal device 200, causes the terminal device 200 to perform the method. In order to obtain such mechanisms there is further provided an Access Management Function 300b, a method performed by the Access Management Function 300b, and a computer program product comprising code, for example in the form of a computer program, that when run on processing circuitry of the Access Management Function 300b, causes the Access Management Function 300b to perform the method.

Figure 2:
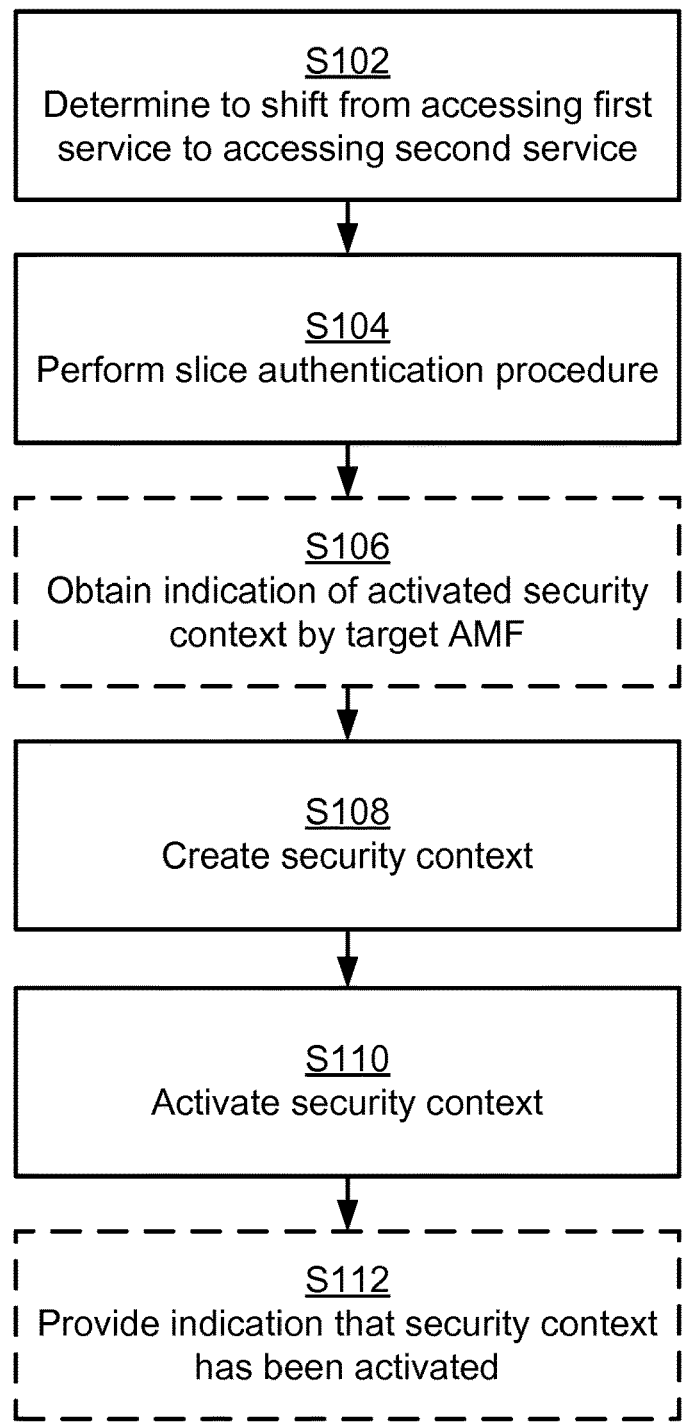
FIGS. 2 and 3 are flowcharts of methods according to embodiments.

Reference is now made to FIG. 2 illustrating a method for network slice isolation as performed by the terminal device 200 according to an embodiment.

S102: The terminal device 200 determines to shift from accessing a first service using a current network slice 160a to accessing a second service using a target network slice 160b. Network access to the current network slice 160a is handled by a source Access Management Function 300a. Network access to the target network slice 160b is handled by a target Access Management Function 300b.

S104: The terminal device 200 performs a slice authentication procedure in response thereto (i.e., in response to having performed step S102). During the authentication procedure a mutual secret is shared between the terminal device 200 and the target Access Management Function 300b.

S108: The terminal device 200 creates a security context for the target network slice 160b based on the mutual secret.

S110: The terminal device 200 activates the security context, thereby security isolating the target network slice 160b from the source Access Management Function 300a.

In this respect, there might be two ways in which the target network slice 160b can be security isolated. When the new security context is activated by a target AMF 300b that is not equal to the source AMF 300a, then spatial network slice isolation is achieved. Spatial network slice isolation thus implies that keys used with one node (such as one AMF) cannot be used to decrypt traffic with another node (such as another AMF). When the new security context is activated by a target AMF 300b that is equal to the source AMF 300a, then time-wise network slice isolation is achieved. Time-wise network slice isolation thus implies that previous keys used with one node (such as one AMF) cannot be used to decrypt traffic protected by new keys with the same node (such as the same AMF). Examples of network slice isolation are forward security and backward security.

Embodiments relating to further details of network slice isolation as performed by the terminal device 200 will now be disclosed.

There may be different ways for the terminal device 200 to determine when to create the security context in step S108. In some aspects the security context is only created after reception of an indication from the target AMF 300b. Particularly, according to an embodiment the terminal device 200 is configured to perform (optional) step S106:

S106: The terminal device 200 obtains an indication that the security context has been activated by the target Access Management Function 300b. The security context is then created in response thereto (i.e., step S108 is performed in response to step S106 having been performed).

This avoids the security context to be created in vain.

There could be different types of indications that are obtained in step S106. According to an embodiment the indication (i.e., the indication as obtained in step S106) is obtained in a non-access stratum (NAS) security mode (SM) command message.

In some aspects the terminal device 200 indicates to the target Access Management Function 300b that the security context has been activated by the terminal device 200. Particularly, according to an embodiment the terminal device 200 is configured to perform (optional) step S112:

S112: The terminal device 200 provides an indication towards the target Access Management Function 300b that the security context has been activated.

There could be different types of indications that are provided in step S112. According to an embodiment the indication (i.e., the indication as provided in step S112) is provided in a NAS SM complete message.

As disclosed above, a slice authentication procedure is performed by the terminal device 200. There might be different entities with which the terminal device 200 performs the slice authentication procedure. According to a first embodiment the slice authentication procedure is performed with the target Access Management Function 300b. According to a second embodiment the slice authentication procedure is performed with the source Access Management Function 300a.

According to a third embodiment the slice authentication procedure is performed with a Session Management Function (SMF) 400 of the target network slice 160b.

There could be different examples of mutual secrets. For example, the mutual secret could be a slice authentication key, a master session key, a token, or a random string.

Figure 3:
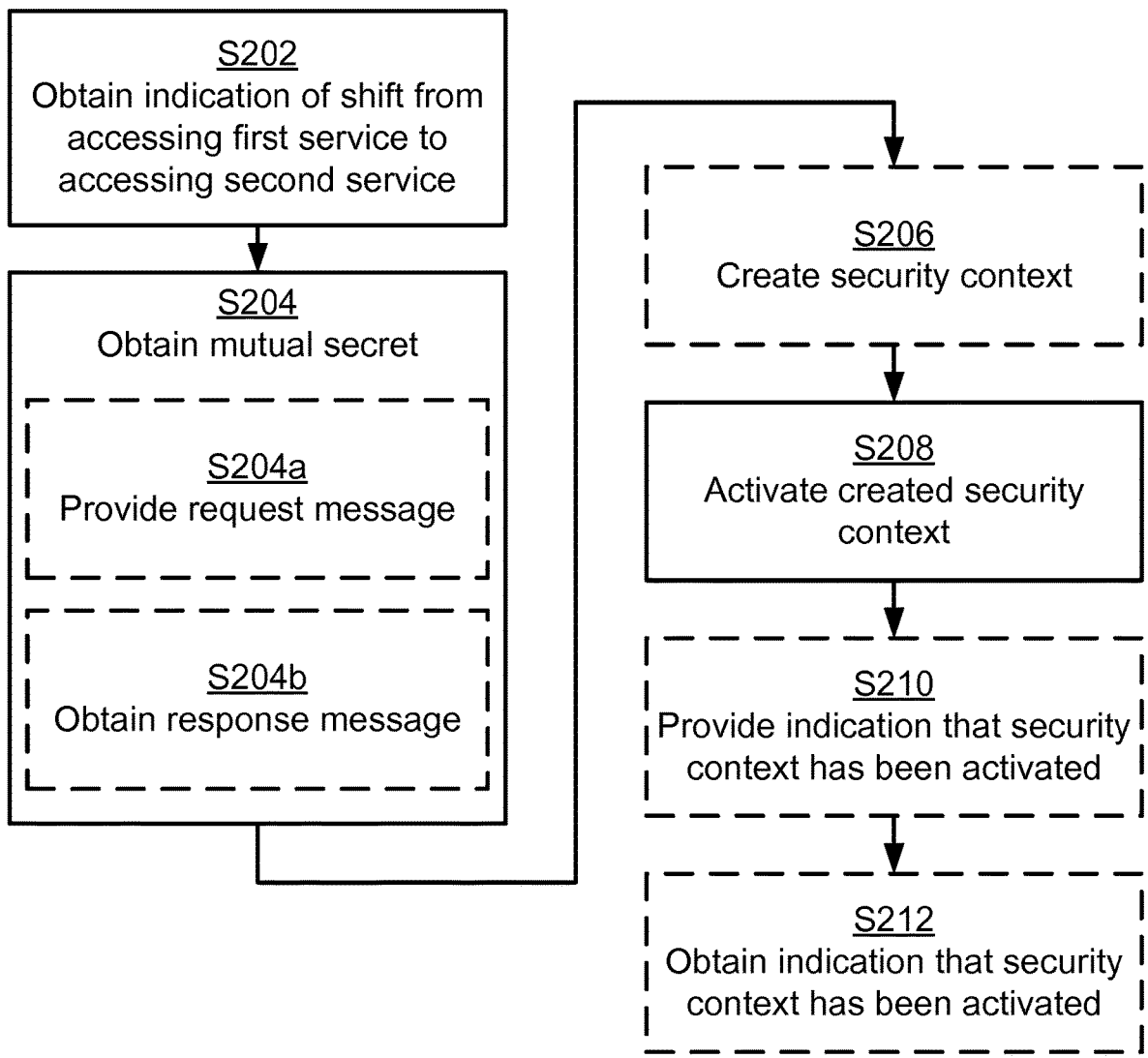

Reference is now made to FIG. 3 illustrating a method for network slice isolation as performed by the Access Management Function 300b according to an embodiment.

S202: The target Access Management Function 300b obtains an indication that the terminal device 200 has determined to shift from accessing a first service using a current network slice 160a to accessing a second service using a target network slice 160b. As noted above, network access to the current network slice 160a is handled by the source Access Management Function 300a, and network access to the target network slice 160b is handled by the target Access Management Function 300b.

S204: The target Access Management Function 300b obtains, as output from a slice authentication procedure, a mutual secret. The slice authentication procedure has been performed with the terminal device 200. The mutual secret is shared between the terminal device 200 and the target Access Management Function 300b.

S208: The target Access Management Function 300b activates a created security context for the target network slice 160b based on the mutual secret, thereby security isolating the target network slice 160b from the source Access Management Function 300a.

As disclosed above there might be two ways in which the target network slice 160b can be security isolated.

Embodiments relating to further details of network slice isolation as performed by the target Access Management Function 300b will now be disclosed.

As disclosed above, in some aspects the terminal device 200 obtains an indication that that the security context has been activated by the target Access Management Function 300b. Hence, according to an embodiment the target Access Management Function 300b is configured to perform (optional) step S210:

S210: The target Access Management Function 300b provides an indication towards the terminal device 200 that the created security context has been activated by the target Access Management Function 300b based on the mutual secret.

There could be different types of indications that are provided in step S210. According to an embodiment the indication is provided in a NAS SM command message.

As disclosed above, in some aspects the terminal device 200 indicates to the target Access Management Function 300b that the security context has been activated by the terminal device 200. Particularly, according to an embodiment the target Access Management Function 300b is configured to perform (optional) step S212:

S212: The target Access Management Function 300b obtains an indication from the terminal device 200 that the security context as created by the terminal device 200 has been activated by the terminal device 200. According to an embodiment the indication (i.e., the indication as obtained in step S212) is obtained in a NAS SM complete message.

As disclosed above, the target Access Management Function 300b activates a created security context. There might be different ways to create this security context.

In some aspects the security context is created by the target Access Management Function 300b. That is, according to an embodiment the target Access Management Function 300b is configured to perform (optional) step S206:

S206: The target Access Management Function 300b creates the security context for the target network slice 160b based on the mutual secret.

In other aspects the new security context created by the source AMF 300a. That is, according to an embodiment the security context has been created by the source Access Management Function 300a.

As disclosed above, a slice authentication procedure has been performed with the terminal device 200. As further disclosed above, there might be different entities with which the terminal device 200 performs the slice authentication procedure. According to a first embodiment the slice authentication procedure is performed between the terminal device 200 and the target Access Management Function 300b. According to a second embodiment the slice authentication procedure is performed between the terminal device 200 and the source Access Management Function 300a. The mutual secret is then obtained from the source Access Management Function 300a. According to a third embodiment the slice authentication procedure is performed between the terminal device 200 and a Session Management Function 400 of the target network slice 160b. The mutual secret is then obtained from the Session Management Function 400.

With respect to this third embodiment, the target Access Management Function 300b might request the Session Management Function 400 to perform the slice authentication procedure. That is, according to an embodiment the target Access Management Function 300b is configured to perform (optional) step S204a as part of step S204:

S204a: The target Access Management Function 300b provides a request message towards the Session Management Function 400 to perform the slice authentication procedure with the terminal device 200.

The mutual secret might then be obtained from the Session Management Function 400. Particularly, according to an embodiment the target Access Management Function 300b is configured to perform (optional) step S204b as part of step S204:

S204b: The target Access Management Function 300b obtains a response message from the Session Management Function 400 once the slice authentication procedure has been performed. The response message then comprises the mutual secret.

As disclosed above, examples of the mutual secret are: a slice authentication key, a master session key, a token, and a random string.

In some aspects the security context is defined by the set of parameters used for protecting the NAS and the AS signalling between the terminal device 200 and the communication network 100. In this respect, NAS signalling is used for the communication between the terminal device 200 and the Access Management Functions 300a, 300b, 300c whereas AS signalling is used for the communication between the terminal device 200 and the radio access network nodes 140a, 140b, 140c, 140d.

For example, the security context could be defined by the mutual secret, by any fresh security keys derived from the mutual secret, and/or by any unique key identifier for the mutual secret [Inventors: please insert more examples of what the security context may be, if suitable].

Figure 4:
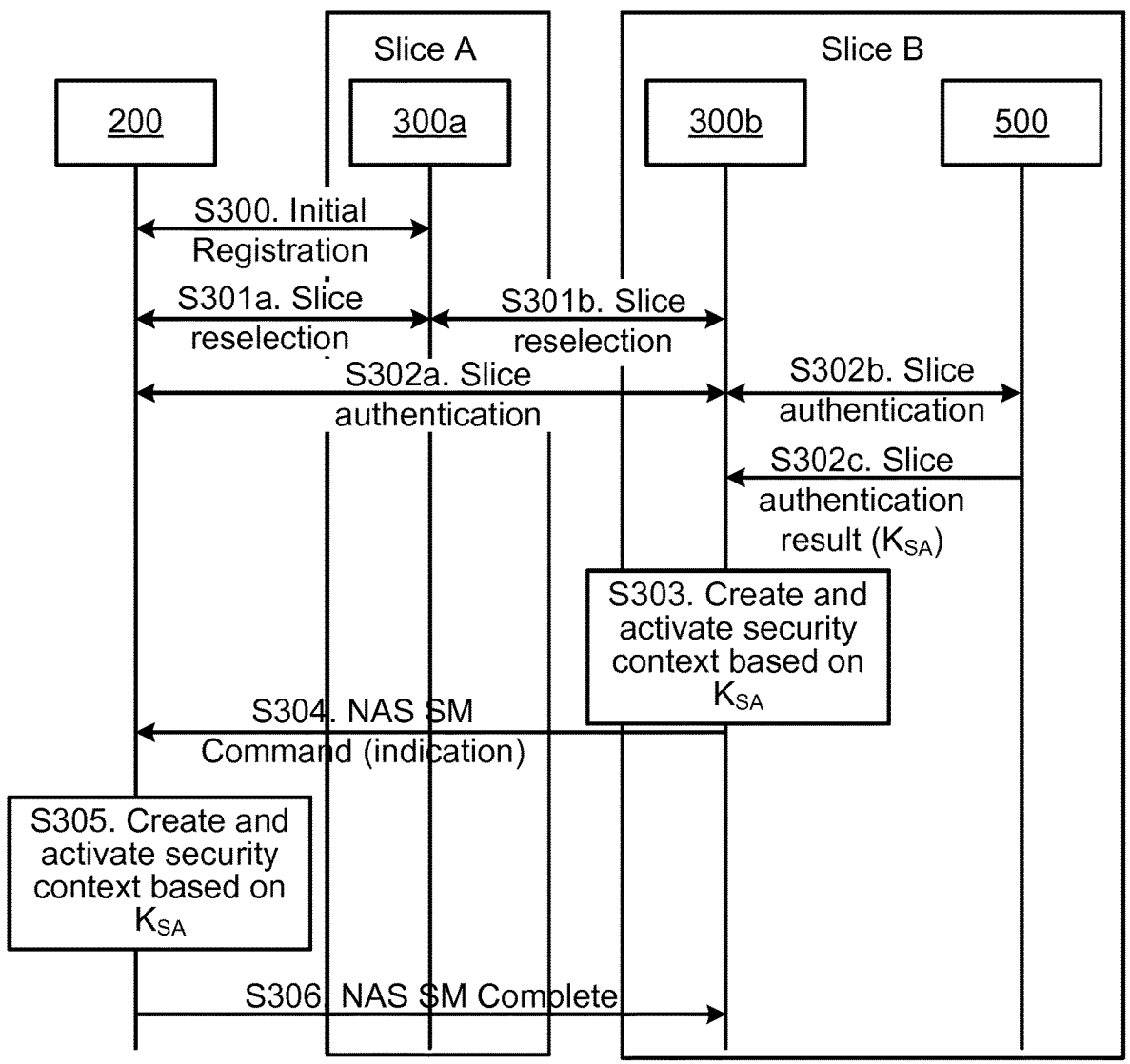
FIGS. 4, 5, 6, and 7 are signalling diagrams according to embodiments.

A first particular embodiment for network slice isolation based on at least some of the above disclosed embodiments will now be disclosed in detail with reference to the signalling diagram of FIG. 4.

S300: The terminal device 200 registers with, and is successfully authenticated to, the communication network 100 and established a security context based on a key $K_{AMF}$. It is assumed that the terminal device 200 is currently using services provided on network slice A, one of the mutually exclusive slices the terminal device 200 is authorized to access. The current AMF key is shared with the source AMF 300a that is assumed to be the authorized Core Network function serving network slice A.

S301a, S301b: The terminal device 200 decides to use services provided by network slice B. This could possibly result in additional signaling between the terminal device 200 and the Core Network and within the Core Network to redirect the terminal device 200 to the correct Network Function handling the access to network slice B. It is here assumed that this Network Function is the Target AMF 300b.

S302a, S302b, S302c: A network slice authentication procedure is triggered between the terminal device 200 and the communication network 100 during which signaling messages are exchanged with the target AMF 300b and possibly involving other network functions, here exemplified by the Authentication, Authorization and Accounting (AAA) entity 500 of network slice B. It is possible that this AAA entity could be an authentication server which is external to the operator network and under the control entity served by network slice B. In some aspects it is assumed that such network slice authentication could use any non-3GPP credentials that are not necessarily under the control of the network operator. A successful authentication run may result in a shared key between the terminal device 200 and the Target AMF 300a. The network slice authentication could be based on the EAP such that the terminal device 200 takes the role of the peer, the target AMF 300b that of the authenticator and the AAA entity the role of the backend authentication server. This is similar to how EAP is currently supported for primary authentication in 5G telecommunication systems with the difference that the Authentication Function (AUSF) endorses the role of the backend server. For the network slice authentication, it could be the AUSF or any other entity not necessarily under the control of the network operator since this would allow using other than the 3GPP credentials for primary access. In the case of EAP, if the used EAP method is key generating such as EAP-TLS or EAP-PSK then a successful authentication result in the establishment of shared keys, i.e. the MSK and the Extended MSK (EMSK) between the terminal device 200 and the AAA entity. The MSK is sent to the authenticator alongside the authentication result, i.e. EAP-SUCCESS in this case. A secret is thereby established between the terminal device 200 and the target AMF 300b following a successful authentication. In some examples, this secret could be a network slice authentication key denoted by $K_{SA}$, or the MSK in case EAP is used. In other examples this secret could be a token or a random string, etc.

S303: The target AMF 300b creates a new security context using the received secret. One possibility is to use directly the received secret if it is a key or to derive a new $K_{AMF}'$ from it using a key derivation function such as the one used in 3GPP standards. In another example the target AMF 300b uses the current AMF key and the received secret to derive the $K_{AMF}'$. This latter example protects against a key leakage in one domain (AAA or Source AMF domains). More precisely, if the $K_{AMF}$ is compromised then the $K_{AMF}'$ is not since the attacker does not know the secret and vice versa. This example does not protect against the very unlikely event that both parameters are compromised at the same time. The target AMF 300b generates and sets up all the necessary context parameters such as the ngKSI and the NAS COUNTs as described in aforementioned document 3GPP TS 33.501.

S304: The target AMF 300b activates the new security context using the NAS SMC procedure described in aforementioned document 3GPP TS 33.501 with the difference that the target AMF 300b indicates in the downlink message (of this step) that the new security context is created based on the secret resulting from the successful slice authentication. This indication could be a Boolean flag, or a value generated using the slice authentication secret. For example, in the case of EAP, it could be a hash of the MSK key and possibly a freshness parameter, e.g. the NAS downlink count value used in this message, etc. Using a parameter generated from the established secret gives more assurance on the result of the slice authentication since it provides the terminal device 200 the means to quickly check that the secret is the same. Otherwise this check would be realized later during the integrity check of the NAS message since the NAS integrity key used in this message is supposed to be derived from the new AMF key $K_{AMF}'$.

S305: Based on the received indication, the terminal device 200 creates a new security context similarly to the target AMF in step 303.

S306: The terminal device 200 replies as with a NAS SM complete message.

The resulting keys established between the terminal device 200 and the target AMF 300b are not known to the source AMF 300a. Therefore, this embodiment does provide forward security. Compared to using a primary authentication following the slice authentication of step S302, this embodiment enables all the signaling overhead involving the AUSF and the UDM in the Home PLMN to be avoided.

Figure 5:
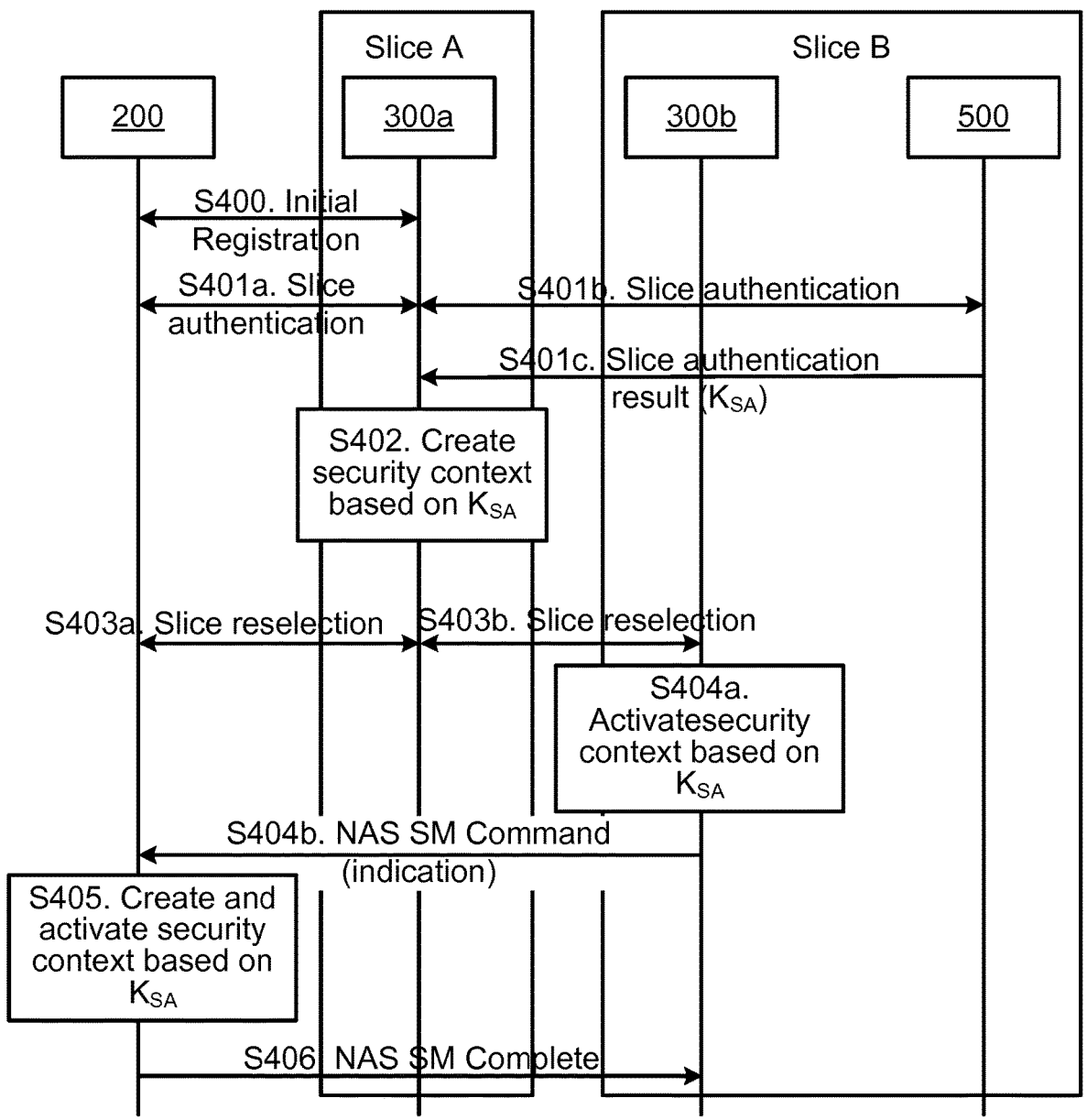

A second particular embodiment for network slice isolation based on at least some of the above disclosed embodiments will now be disclosed in detail with reference to the signalling diagram of FIG. 5.

This second embodiment is related to a scenario where the AMF re-allocation, or redirection from source AMF 300a to target AMF 300b takes place after the slice authentication. This would not provide the same level of key separation, but it still binds the result of the authentication and provides backward security. When AMF relocation takes place after the slice authentication, there are different variants depending on how the new security context is established, i.e. by the source AMF 300a or the target AMF 300b.

S400: The terminal device 200 registers with, and is successfully authenticated to, the communication network 100 and established a security context based on a key $K_{AMF}$. It is assumed that the terminal device 200 is currently using services provided on network slice A, one of the mutually exclusive slices the terminal device 200 is authorized to access. The current AMF key is shared with the source AMF 300a that is assumed to be the authorized Core Network function serving network slice A.

S401a, S401b, S401c: The terminal device 200 decides to use services provided by network slice B. This could possibly result in additional signaling between the terminal device 200 and the Core Network and within the Core Network to redirect the terminal device 200 to the correct Network Function handling the access to network slice B. It is here assumed that this Network Function is the Target AMF 300b.

But before redirecting the terminal device 200 to the Target AMF 300b, a slice authentication procedure is triggered by the Source AMF 300a between the terminal device 200 and the communication network 100 during which signaling messages are exchanged between the terminal device 200 and the Source AMF 300a and possibly involving other network functions, here exemplified by the AAA entity 500. It is possible that this AAA entity could be an authentication server which is external to the operator network and under the control entity served by network slice B. In some aspects it is assumed that such network slice authentication could use any non-3GPP credentials that are not necessarily under the control of the network operator. A successful authentication run may result in a shared key between the terminal device 200 and the Source AMF 300a. The network slice authentication could be based on EAP such that the terminal device 200 takes the role of the peer, the source AMF 300a that of the authenticator and the AAA entity the role of the backend authentication server. This is similar to how EAP is currently supported for primary authentication in 5G telecommunication systems with the difference that the AUSF endorses the role of the backend server. For the network slice authentication, it could be the AUSF or any other entity not necessarily under the control of the network operator since this would allow using other than the 3GPP credentials for primary access. In the case of EAP, if the used EAP method is key generating such as EAP-TLS or EAP-PSK then a successful authentication result in the establishment of shared keys, i.e. the MSK and the EMSK between the terminal device 200 and the AAA entity. The MSK is sent to the authenticator alongside the authentication result, i.e. EAP-SUCCESS in this case. A secret is thereby established between the terminal device 200 and the source AMF 300a following a successful authentication. In some examples, this secret could be a network slice authentication key denoted by $K_{SA}$, or the master session key (MSK) in case EAP is used. In other examples this secret could be a token or a random string, etc.

S402: The Source AMF 300a creates a new security context using the received secret. One possibility is to use directly the received secret if it is a key or to derive a new $K_{AMF}'$ from it using a key derivation function such as the one used in 3GPP standards. In another example the Source AMF 300a uses the current AMF key and the received secret to derive the $K_{AMF}'$. This latter example protects against a key leakage in one domain (AAA or Source AMF domains). More precisely, if the $K_{AMF}$ is compromised then the $K_{AMF}'$ is not since the attacker does not know the secret and vice versa. This example does not protect against the very unlikely event that both parameters are compromised at the same time. The Source AMF 300a generates and sets up all the necessary context parameters such as the ngKSI and the NAS COUNTs as described in aforementioned document 3GPP TS 33.501. This embodiment does not provide forward security since the source AMF 300a knows the key used at the target. Nevertheless, is does provide backward security since the target key is derived using a one-way function.

S403a, S403b: Additional signaling takes place between the terminal device 200 and the Core Network and within the Core Network to redirect the terminal device 200 to the correct Network Function handling the access to network Slice B. It is here assumed that this Network Function is the Target AMF 300b.

S404: The Target AMF 300b activates the new security context using the NAS SMC procedure described in aforementioned document 3GPP TS 33.501 with the difference that the target AMF 300b indicates in the downlink message (of this step) that the new security context is created based on the secret resulting from the successful slice authentication. This indication could be a Boolean flag, or a value generated using the slice authentication secret. For example, in the case of EAP, it could be a hash of the MSK key and possibly a freshness parameter, e.g. the NAS downlink count value used in this message, etc. Using a parameter generated from the established secret gives more assurance on the result of the slice authentication since it provides the terminal device 200 the means to quickly check that the secret is the same. Otherwise this check would be realized later during the integrity check of the NAS message since the NAS integrity key used in this message is supposed to be derived from the new AMF key $K_{AMF}'$.

S405: Based on the received indication, the terminal device 200 creates a new security context similarly to the source AMF in step 403.

S406: The terminal device 200 replies as with a NAS SM complete message.

The resulting keys established between the terminal device 200 and the Target AMF 300b are known to the Source AMF 300a. Therefore, this embodiment does not provide forward security, nevertheless it provides backward security and binds the result of the network slice authentication (represented by $K_{SA}$) to the result of the primary authentication (represented by $K_{AMF}$).

Figure 6:
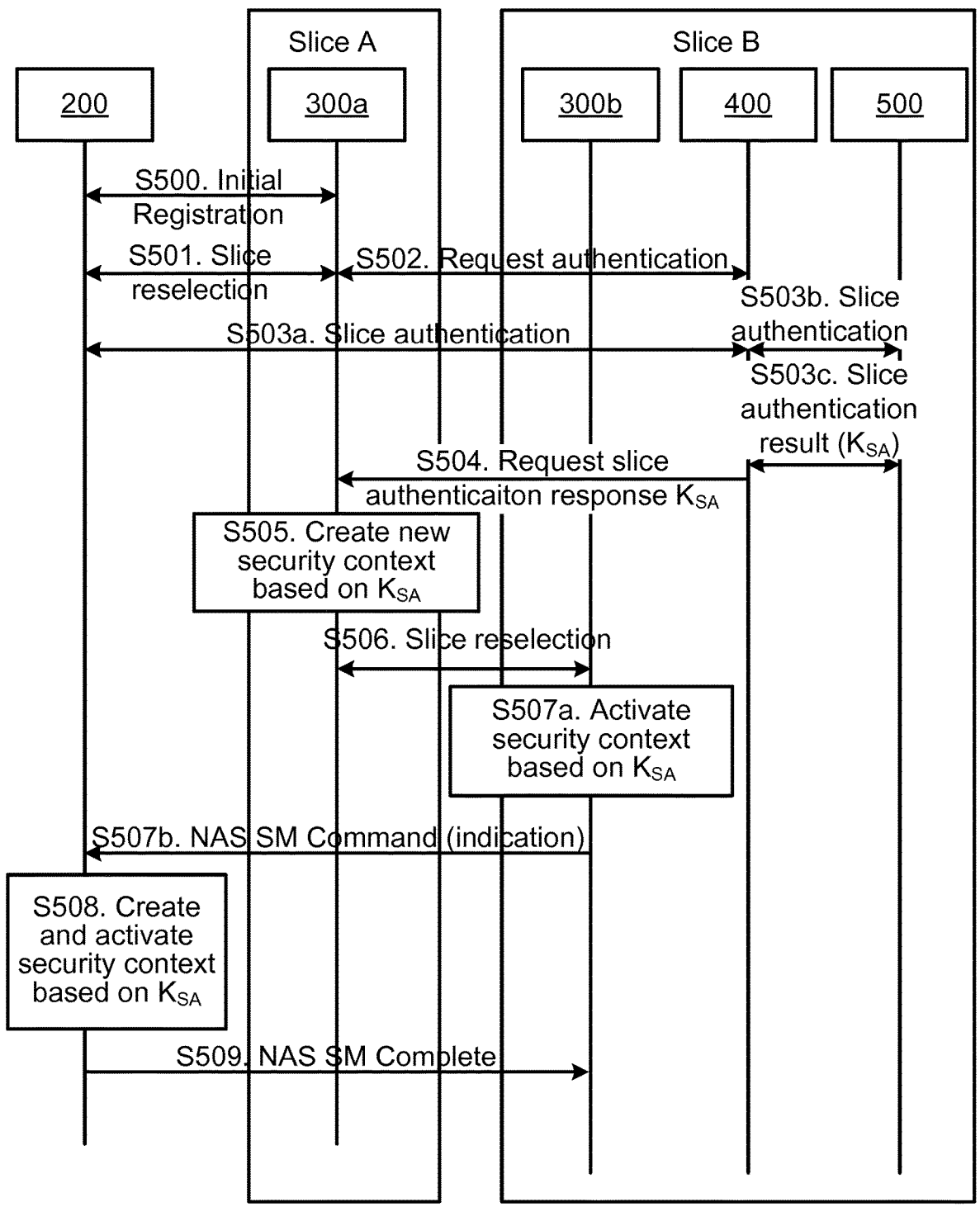

A third particular embodiment for network slice isolation based on at least some of the above disclosed embodiments will now be disclosed in detail with reference to the signalling diagram of FIG. 6.

This third embodiment is related to a scenario where the slice authentication is performed by the SMF 400 (exemplifying one of the network functions) of the target network slice, triggered by the Source AMF 300a before network slice reselection is taking place.

S500: The terminal device 200 registers with, and is successfully authenticated to, the communication network 100 and established a security context based on a key $K_{AMF}$. It is assumed that the terminal device 200 is currently using services provided on network slice A, one of the mutually exclusive slices the terminal device 200 is authorized to access. The current AMF key is shared with the source AMF 300a that is assumed to be the authorized Core Network function serving network slice A.

S501: The terminal device 200 decides to use services provided by network slice B. This could possibly result in additional signaling between the terminal device 200 and the Core Network and within the Core Network to redirect the terminal device 200 to the correct Network Function handling the access to network slice B. In another example, the message in step S5011 could be a protocol data unit (PDU) Session Establishment Request by which the terminal device 200 starts a PDU Session Establishment procedure requiring services provided by network slice B. Steps S501 to S504 could then match the legacy PDU Session Establishment procedure with the difference is that the authentication procedure (now similar to the secondary authentication procedure described in aforementioned document 3GPP TS 33.501) within may result in a key (KSA) and with the addition that this key is sent back to the Source AMF 300b in the last PDU Session procedure message (carrying the PDU Session Accept message to the terminal device 200). This is further described in step S503.

S502: Before redirecting the terminal device 200 to the Target AMF 300b, the Source AMF 300a requests the SMF of network slice B to perform a slice authentication procedure for the terminal device 200. This could be realized by the a request message for the purpose of triggering a slice authentication procedure.

S503a, S503b, S503c: A slice authentication procedure is initiated by the SMF of network slice B between the terminal device 200 and the communication network 100 during which signaling messages are exchanged between the terminal device 200 and the SMF of network slice B and possibly involving other network functions here exemplified by the AAA entity 500. It is possible that this AAA entity could be an authentication server which is external to the operator network and under the control entity served by network slice B. In some aspects it is assumed that such network slice authentication could use any non-3GPP credentials that are not necessarily under the control of the network operator. In some aspects it is assumed that such network slice authentication could use any non-3GPP credentials that are not necessarily under the control of the network operator. A successful authentication run may result in a shared key between the terminal device 200 and the SMF of network slice B. The SMF of network slice B provides the shared key to the Source AMF 300a. The network slice authentication could be based on EAP such that the terminal device 200 takes the role of the peer, the SMF of the network slice B that of the authenticator and the AAA entity the role of the backend authentication server. This is similar to how EAP is currently supported for primary authentication in 5G telecommunication systems with the difference that the AUSF endorses the role of the backend server. For the network slice authentication, it could be the AUSF or any other entity not necessarily under the control of the network operator since this would allow using other than the 3GPP credentials for primary access. In the case of EAP, if the used EAP method is key generating such as EAP-TLS or EAP-PSK then a successful authentication result in the establishment of shared keys, i.e. MSK and EMSK between the terminal device 200 and the AAA entity. The MSK is sent to the authenticator alongside the authentication result, i.e. EAP-SUCCESS in this case. A secret is thereby established between the terminal device 200 and the SMF of the network slice B following a successful authentication. In some examples, this secret could be a network slice authentication key denoted by $K_{SA}$, or the MSK in case EAP is used. In other examples this secret could be a token or a random string, etc.

S504: The SMF of the network slice B provides the shared key to the Source AMF 300a.

S505: The Source AMF 300a creates a new security context using the received secret. One possibility is to use directly the received secret if it is a key or to derive a new $K_{AMF}'$ from it using a key derivation function such as the one used in 3GPP standards. In another example the Source AMF 300a uses the current AMF key and the received secret to derive the $K_{AMF}'$. This latter example protects against a key leakage in one domain (AAA or Source AMF domains). More precisely, if the $K_{AMF}$ is compromised then the $K_{AMF}'$ is not since the attacker does not know the secret and vice versa. This example does not protect against the very unlikely event that both parameters are compromised at the same time. The Source AMF 300a generates and sets up all the necessary context parameters such as the ngKSI and the NAS COUNTs as described in aforementioned document 3GPP TS 33.501.

S506: Additional signaling takes place between the terminal device 200 and the Core Network and within the Core Network to redirect the terminal device 200 to the correct Network Function handling the access to network Slice B. It is here assumed that this Network Function is the Target AMF 300b.

S507a, S507b: The Target AMF 300b activates the new security context using the NAS SMC procedure described in aforementioned document 3GPP TS 33.501 with the difference that the Target AMF 300b indicates in the downlink message (of this step) that the new security context is created based on the secret resulting from the successful slice authentication. This indication could be a Boolean flag, or a value generated using the slice authentication secret. For example, in the case of EAP, it could be a hash of the MSK key and possibly a freshness parameter, e.g. the NAS downlink count value used in this message, etc. Using a parameter generated from the established secret gives more assurance on the result of the slice authentication since it provides the terminal device 200 the means to quickly check that the secret is the same. Otherwise this check would be realized later during the integrity check of the NAS message since the NAS integrity key used in this message is supposed to be derived from the new AMF key $K_{AMF}'$. Alternatively, the Source AMF 300a activates the new security context before the network slice reselection and sends the new activated security context (based on $K_{AMF}'$) to the Target AMF 300b during the network slice reselection. In FIG. 6, this implies that steps S507-S509 would be performed between the terminal device 200 and the Source AMF 300a before step S506 is performed.

S508: Based on the received indication, the terminal device 200 creates a new security context similarly to the source AMF in step 503.

S509: The terminal device 200 replies as with a NAS SM complete message.

The resulting keys established between the terminal device 200 and the Target AMF 300b are known to the Source AMF 300a. Therefore, this embodiment does not provide forward security, nevertheless it provides backward security and binds the result of the network slice authentication (represented by $K_{SA}$) to the result of the primary authentication (represented by $K_{AMF}$).

Figure 7:
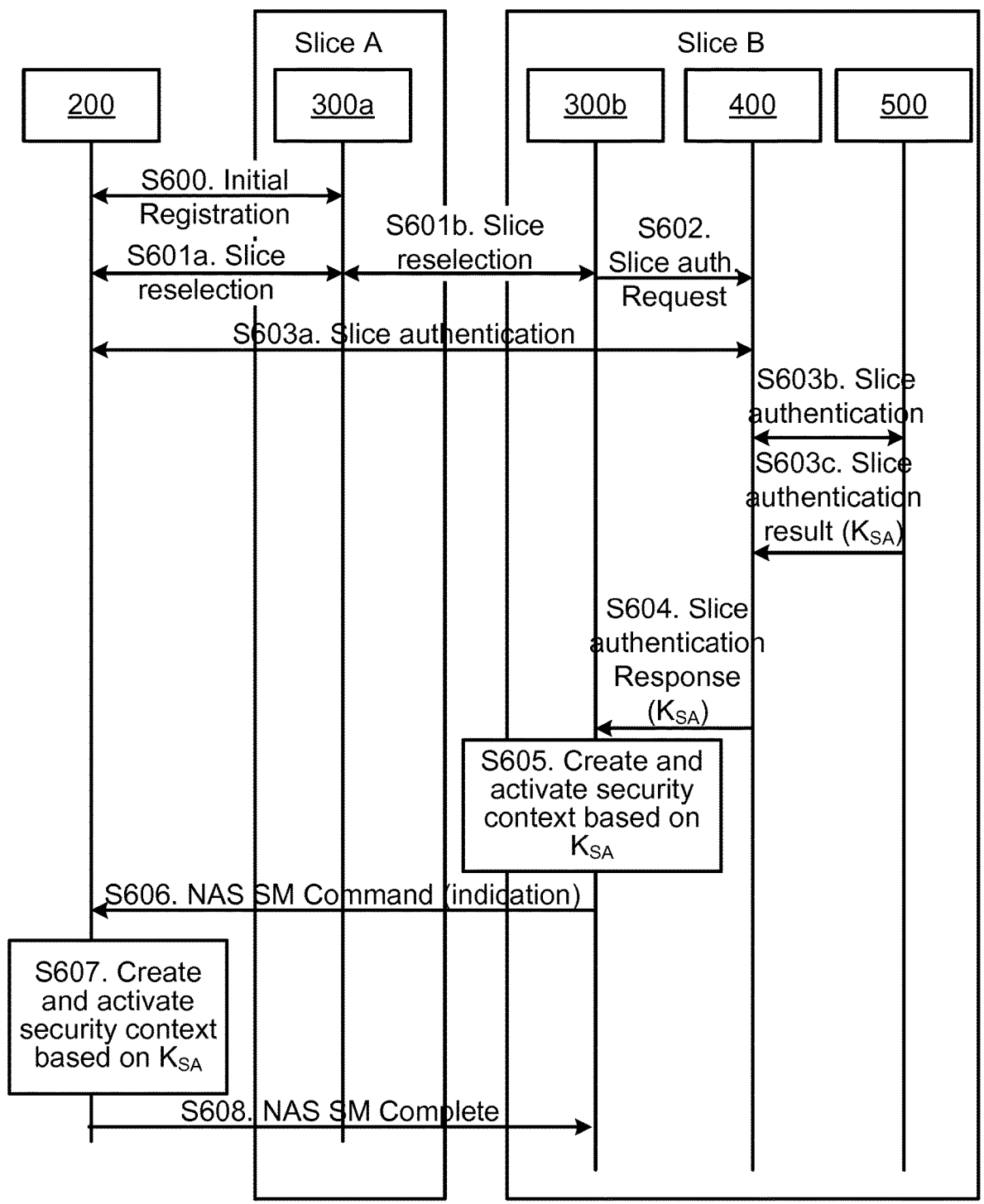

A fourth particular embodiment for network slice isolation based on at least some of the above disclosed embodiments will now be disclosed in detail with reference to the signalling diagram of FIG. 7.

This fourth embodiment is related to a scenario where the slice authentication is performed by the SMF 400 (exemplifying one of the network functions) of the target network slice after network slice reselection is taking place.

S600: The terminal device 200 registers with, and is successfully authenticated to, the communication network 100 and established a security context based on a key $K_{AMF}$. It is assumed that the terminal device 200 is currently using services provided on network slice A, one of the mutually exclusive slices the terminal device 200 is authorized to access. The current AMF key is shared with the source AMF 300a that is assumed to be the authorized Core Network function serving network slice A.

S601a, S601b: The terminal device 200 decides to use services provided by network slice B. This could possibly result in additional signaling between the terminal device 200 and the Core Network and within the Core Network to redirect the terminal device 200 to the correct Network Function handling the access to network slice B. It is here assumed that this Network Function is the Target AMF 300b. In another example, the message in step S5011 could be a protocol data unit (PDU) Session Establishment Request by which the terminal device 200 starts a PDU Session Establishment procedure requiring services provided by network slice B. Steps S601 to S604 could then match the legacy PDU Session Establishment procedure with the difference is that the authentication procedure (now similar to the secondary authentication procedure described in aforementioned document 3GPP TS 33.501) within may result in a key ($K_{SA}$) and with the addition that this key is sent back to the Source AMF 300b in the last PDU Session procedure message (carrying the PDU Session Accept message to the terminal device 200). This is further described in step S603.

S602: The Target AMF 300b requests the SMF of network Slice B to perform a slice authentication procedure with the terminal device 200.

S603a, S603b, S603c: A slice authentication procedure is triggered between the terminal device 200 and the communication network 100 during which signaling messages are exchanged between the SMF of network slice B and possibly involving other network functions, here exemplified by the AAA entity 500. It is possible that this AAA entity could be an authentication server which is external to the operator network and under the control entity served by network slice B. In some aspects it is assumed that such network slice authentication could use any non-3GPP credentials that are not necessarily under the control of the network operator. A successful authentication run may result in a shared key between the terminal device 200 and the SMF of network Slice B. The network slice authentication could be based on EAP such that the terminal device 200 takes the role of the peer, the SMF of network Slice B that of the authenticator and the AAA entity the role of the backend authentication server. This is similar to how EAP is currently supported for primary authentication in 5G telecommunication systems with the difference that the AUSF endorses the role of the backend server. For the network slice authentication, it could be the AUSF or any other entity not necessarily under the control of the network operator since this would allow using other than the 3GPP credentials for primary access. In the case of EAP, if the used EAP method is key generating such as EAP-TLS or EAP-PSK then a successful authentication result in the establishment of shared keys, i.e. MSK and EMSK between the terminal device 200 and the AAA entity. The MSK is sent to the authenticator alongside the authentication result, i.e. EAP-SUCCESS in this case. A secret is thereby established between the terminal device 200 and the target AMF 300b following a successful authentication. In some examples, this secret could be a network slice authentication key denoted by $K_{SA}$, or the MSK in case EAP is used. In other examples this secret could be a token or a random string, etc.

S604: The SMF of network Slice B provides the shared key to the Target AMF 300b.

S605: The Target AMF 300b creates a new security context using the received secret. One possibility is to use directly the received secret if it is a key or to derive a new $K_{AMF}'$ from it using a key derivation function such as the one used in 3GPP standards. In another example the target AMF 300b uses the current AMF key and the received secret to derive the $K_{AMF}'$. This latter example protects against a key leakage in one domain (AAA or Source AMF domains). More precisely, if the $K_{AMF}$ is compromised then the $K_{AMF}'$ is not since the attacker does not know the secret and vice versa. This example does not protect against the very unlikely event that both parameters are compromised at the same time. The target AMF 300b generates and sets up all the necessary context parameters such as the ngKSI and the NAS COUNTs as described in aforementioned document 3GPP TS 33.501.

S606: The target AMF 300b activates the new security context using the NAS SMC procedure described in aforementioned document 3GPP TS 33.501 with the difference that the target AMF 300b indicates in the downlink message (of this step) that the new security context is created based on the secret resulting from the successful slice authentication. This indication could be a Boolean flag, or a value generated using the slice authentication secret. For example, in the case of EAP, it could be a hash of the MSK key and possibly a freshness parameter, e.g. the NAS downlink count value used in this message, etc. Using a parameter generated from the established secret gives more assurance on the result of the slice authentication since it provides the terminal device 200 the means to quickly check that the secret is the same. Otherwise this check would be realized later during the integrity check of the NAS message since the NAS integrity key used in this message is supposed to be derived from the new AMF key $K_{AMF}'$.

S607: Based on the received indication, the terminal device 200 creates a new security context similarly to the target AMF in step 603.

S608: The terminal device 200 replies as with a NAS SM complete message.

The resulting keys established between the terminal device 200 and the target AMF 300b are not known to the source AMF 300a. Therefore, this embodiment does provide forward security. Compared to using a primary authentication following the slice authentication of step S602, this embodiment allows all the signaling overhead involving the AUSF and the UDM in the Home PLMN to be avoided.

Figure 8:
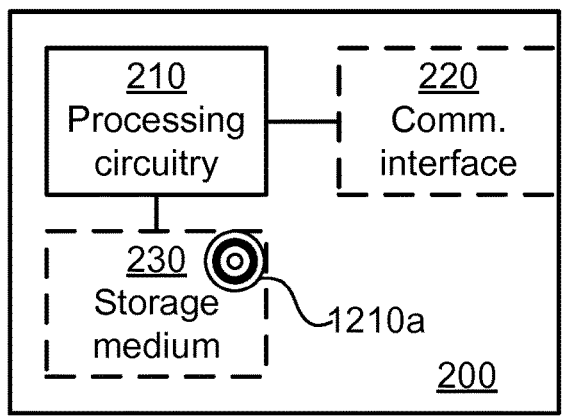
FIG. 8 is a schematic diagram showing functional units of a terminal device according to an embodiment.

FIG. 8 schematically illustrates, in terms of a number of functional units, the components of a terminal device 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1210a (as in FIG. 12), e.g. in the form of a storage medium 230. The processing circuitry 210 may further be provided as at least one application specific integrated circuit (ASIC), or field programmable gate array (FPGA).

Particularly, the processing circuitry 210 is configured to cause the terminal device 200 to perform a set of operations, or steps, as disclosed above. For example, the storage medium 230 may store the set of operations, and the processing circuitry 210 may be configured to retrieve the set of operations from the storage medium 230 to cause the terminal device 200 to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The terminal device 200 may further comprise a communications interface 220 for communications with other entities, nodes, functions, and devices of the communication network 100. As such the communications interface 220 may comprise one or more transmitters and receivers, comprising analogue and digital components.

The processing circuitry 210 controls the general operation of the terminal device 200 e.g. by sending data and control signals to the communications interface 220 and the storage medium 230, by receiving data and reports from the communications interface 220, and by retrieving data and instructions from the storage medium 230.

Other components, as well as the related functionality, of the terminal device 200 are omitted in order not to obscure the concepts presented herein.

Figure 9:
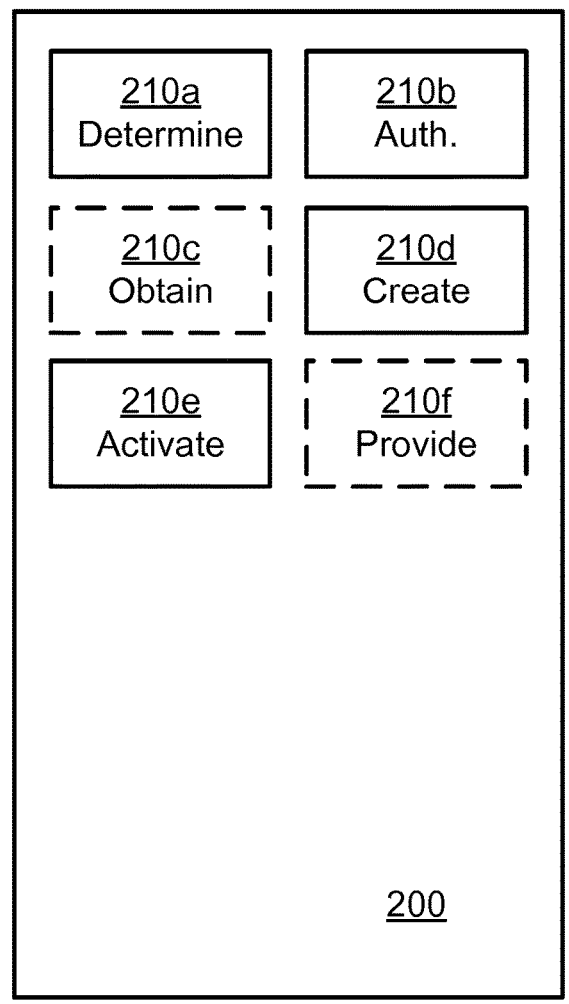
FIG. 9 is a schematic diagram showing functional modules of a terminal device according to an embodiment.

FIG. 9 schematically illustrates, in terms of a number of functional modules, the components of a terminal device 200 according to an embodiment. The terminal device 200 of FIG. 9 comprises a number of functional modules; a determine module 210a configured to perform step S102, an authentication module 210b configured to perform step S104, a create module 210d configured to perform step S108, and an activate module 210e configured to perform step S110. The terminal device 200 of FIG. 9 may further comprise a number of optional functional modules, such as any of an obtain module 210c configured to perform step S106, and a provide module 210f configured to perform step S112. In general terms, each functional module 210a-210f may be implemented in hardware or in software. Preferably, one or more or all functional modules 210a-210f may be implemented by the processing circuitry 210, possibly in cooperation with the communications interface 220 and/or the storage medium 230. The processing circuitry 210 may thus be arranged to from the storage medium 230 fetch instructions as provided by afunctional module 210a-210f and to execute these instructions, thereby performing any steps of the terminal device 200 as disclosed herein.

Figure 10:
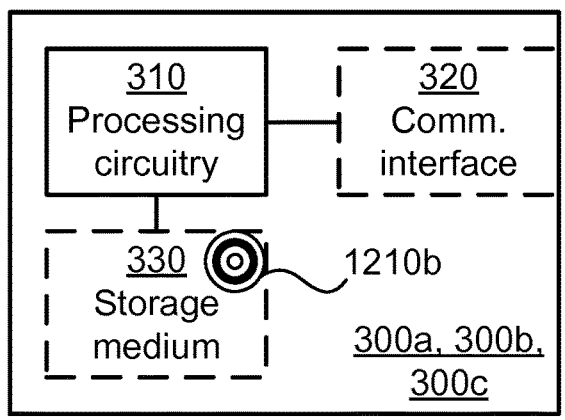
FIG. 10 is a schematic diagram showing functional units of an Access Management Function according to an embodiment.

FIG. 10 schematically illustrates, in terms of a number of functional units, the components of an Access Management Function 300b according to an embodiment.

Processing circuitry 310 is provided using any combination of one or more of a suitable central processing unit (CPU), multiprocessor, microcontroller, digital signal processor (DSP), etc., capable of executing software instructions stored in a computer program product 1210b (as in FIG. 12), e.g. in the form of a storage medium 330. The processing circuitry 310 may further be provided as at least one application specific integrated circuit (ASIC), or field programmable gate array (FPGA).

Particularly, the processing circuitry 310 is configured to cause the Access Management Function 300b to perform a set of operations, or steps, as disclosed above. For example, the storage medium 330 may store the set of operations, and the processing circuitry 310 may be configured to retrieve the set of operations from the storage medium 330 to cause the Access Management Function 300b to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The Access Management Function 300b may further comprise a communications interface 320 for communications with other entities, nodes, functions, and devices of the communication network 100. As such the communications interface 320 may comprise one or more transmitters and receivers, comprising analogue and digital components.

The processing circuitry 310 controls the general operation of the Access Management Function 300b e.g. by sending data and control signals to the communications interface 320 and the storage medium 330, by receiving data and reports from the communications interface 320, and by retrieving data and instructions from the storage medium 330. Other components, as well as the related functionality, of the Access Management Function 300b are omitted in order not to obscure the concepts presented herein.

Figure 11:
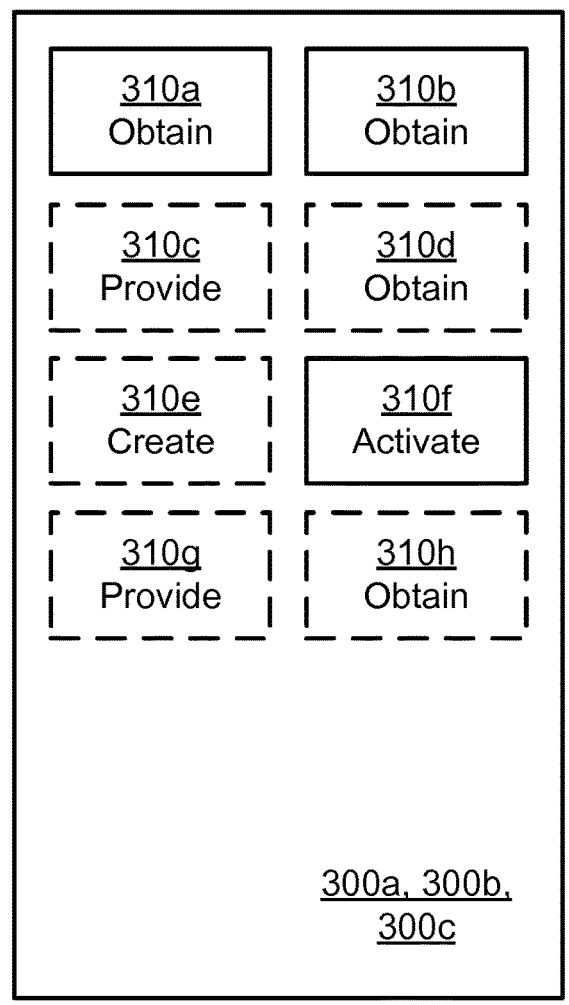
FIG. 11 is a schematic diagram showing functional modules of an Access Management Function according to an embodiment.

FIG. 11 schematically illustrates, in terms of a number of functional modules, the components of an Access Management Function 300b according to an embodiment.

The Access Management Function 300b of FIG. 11 comprises a number of functional modules; an obtain module 310a configured to perform step S202, an obtain module 310b configured to perform step S204, and an activate module 310f configured to perform step S208. The Access Management Function 300b of FIG. 11 may further comprise a number of optional functional modules, such as any of a provide module 310c configured to perform step S204a, an obtain module 310d configured to perform step S204b, a create module 310e configured to perform step S206, a provide module 310g configured to perform step S210, and an obtain module 310h configured to perform step S212. In general terms, each functional module 310a-310h may be implemented in hardware or in software. Preferably, one or more or all functional modules 310a-310h may be implemented by the processing circuitry 310, possibly in cooperation with the communications interface 320 and/or the storage medium 330. The processing circuitry 310 may thus be arranged to from the storage medium 330 fetch instructions as provided by a functional module 310a-310h and to execute these instructions, thereby performing any steps of the Access Management Function 300b as disclosed herein.

The Access Management Function 300b may be provided as a standalone device or as a part of at least one further device. For example, the Access Management Function 300b may be provided in a node of the node of the core network 120. Alternatively, functionality of the Access Management Function 300b may be distributed between at least two devices, or nodes. These at least two nodes, or devices, may either be part of the same network part or may be spread between at least two such network parts. In general terms, instructions that are required to be performed in real time may be performed in a device, or node, operatively closer to the cell than instructions that are not required to be performed in real time.

Thus, a first portion of the instructions performed by the Access Management Function 300b may be executed in a first device, and a second portion of the of the instructions performed by the Access Management Function 300b may be executed in a second device; the herein disclosed embodiments are not limited to any particular number of devices on which the instructions performed by the Access Management Function 300b may be executed. Hence, the methods according to the herein disclosed embodiments are suitable to be performed by a Access Management Function 300b residing in a cloud computational environment. Therefore, although a single processing circuitry 310 is illustrated in FIG. 10 the processing circuitry 310 may be distributed among a plurality of devices, or nodes. The same applies to the functional modules 310a-310h of FIG. 11 and the computer program 1220b of FIG. 12.

Figure 12:
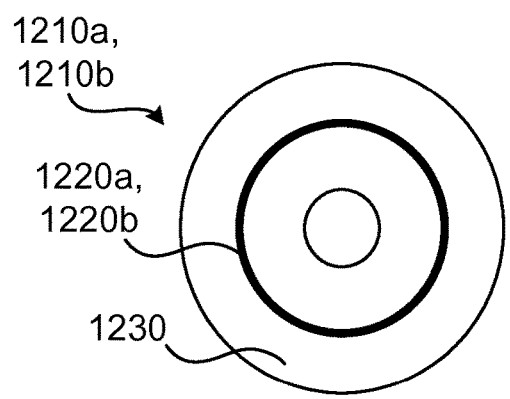
FIG. 12 shows one example of a computer program product comprising computer readable means according to an embodiment.

FIG. 12 shows one example of a computer program product 1210a, 1210b comprising computer readable means 1230. On this computer readable means 1230, a computer program 1220a can be stored, which computer program 1220a can cause the processing circuitry 210 and thereto operatively coupled entities and devices, such as the communications interface 220 and the storage medium 230, to execute methods according to embodiments described herein. The computer program 1220a and/or computer program product 1210a may thus provide means for performing any steps of the terminal device 200 as herein disclosed. On this computer readable means 1230, a computer program 1220b can be stored, which computer program 1220b can cause the processing circuitry 310 and thereto operatively coupled entities and devices, such as the communications interface 320 and the storage medium 330, to execute methods according to embodiments described herein. The computer program 1220b and/or computer program product 1210b may thus provide means for performing any steps of the Access Management Function 300b as herein disclosed.

In the example of FIG. 12, the computer program product 1210a, 1210b is illustrated as an optical disc, such as a CD (compact disc) or a DVD (digital versatile disc) or a Blu-Ray disc. The computer program product 1210a, 1210b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1220a, 1220b is here schematically shown as a track on the depicted optical disk, the computer program 1220a, 1220b can be stored in any way which is suitable for the computer program product 1210a, 1210b.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for network slice isolation, the method being performed by a terminal device, the method comprising:
   determining, by the terminal device, to shift from accessing a first service using a current network slice to accessing a second service using a target network slice, network access to the current network slice being handled by a source Access Management Function (AMF) currently serving the terminal device, and network access to the target network slice being handled by another target AMF that is separate from the source AMF;
   in response to a determination by the terminal device to shift from the source AMF to the target AMF to access the second service using the target network slice handled by the target AMF, performing, by the terminal device, a slice authentication procedure that includes sharing a mutual secret between the terminal device and the target AMF;
   creating, by the terminal device, a security context for the target network slice based on the mutual secret; and
   activating, by the terminal device, the security context, thereby security isolating the target network slice from the source AMF.

2. The method according to claim 1, further comprising:
   obtaining, by the terminal device, an indication that that the security context has been activated by the target AMF, wherein the security context is created in response thereto to an activation of the security context by the target AMF.

3. The method according to claim 2, wherein the indication is obtained in a non-access stratum, NAS, security mode, SM, command message.

4. The method according to claim 1, further comprising:
   providing, by the terminal device, an indication to the target AMF that the security context has been activated.

5. The method according to claim 4, wherein the indication is provided in a non-access stratum, NAS, security mode, SM, complete message.

6. The method according to claim 1, wherein the slice authentication procedure is performed with the target AMF.

7. The method according to claim 1, wherein the slice authentication procedure is performed with the source AMF.

8. A method for network slice isolation, the method being performed by a target Access Management Function (AMF), the method comprising:
   obtaining, by the target AMF, an indication that a terminal device has determined to shift from accessing a first service using a current network slice to accessing a second service using a target network slice, network access to the current network slice being handled by another source AMF currently serving the terminal device, and network access to the target network slice being handled by the target AMF that is separate from the source AMF;
   obtaining, by the target AMF, as an output from a slice authentication procedure, a mutual secret that is shared between the terminal device and the target AMF, the slice authentication procedure having been performed with the terminal device; and
   activating, by the target AMF, a created security context for the target network slice based on the mutual secret, thereby security isolating the target network slice from the source AMF.

9. The method according to claim 8, further comprising:
   providing, by the target AMF, an indication to the terminal device that the created security context has been activated by the target Access Management Function AMF based on the mutual secret.

10. The method according to claim 9, wherein the indication is provided in a non-access stratum, NAS, security mode, SM, command message.

11. The method according to claim 8, further comprising:
    obtaining, by the target AMF, an indication from the terminal device that the security context as created by the terminal device has been activated by the terminal device.

12. The method according to claim 11, wherein the indication is obtained in a non-access stratum, NAS, security mode, SM, complete message.

13. The method according to claim 8, further comprising:
    creating, by the target AMF, the security context for the target network slice based on the mutual secret.

14. The method according to claim 8, wherein the security context has been created by the source AMF.

15. The method according to claim 8, wherein the slice authentication procedure is performed between the terminal device and the target AMF.

16. The method according to claim 8, wherein the slice authentication procedure is performed between the terminal device and the source AMF, and wherein the mutual secret is obtained from the source AMF.

17. The method according to claim 8, wherein the slice authentication procedure is performed between the terminal device and a Session Management Function (SMF) of the target network slice, and wherein the mutual secret is obtained from the SMF.

18. The method according to claim 17, further comprising:
    providing, by the target AMF, a request message to the SMF to perform the slice authentication procedure with the terminal device.

19. A terminal device for network slice isolation, the terminal device comprising processing circuitry, the processing circuitry being configured to:
cause the terminal device to:
shift from accessing a first service using a current network slice to accessing a second service using a target network slice, network access to the current network slice being handled by a source Access Management Function (AMF) currently serving the terminal device, and network access to the target network slice being handled by another target AMF that is separate from the source AMF;
in response to a determination by the terminal device to shift from the source AMF to the target AMF to access the second service using the target network slice handled by the target AMF, perform a slice authentication procedure that includes sharing a mutual secret between the terminal device and the target AMF;
create a security context for the target network slice based on the mutual secret; and
activate the security context, thereby security isolating the target network slice from the source AMF.

20. An Access Management Function (AMF) for network slice isolation, the AMF acting as a target AMF and comprising processing circuitry, the processing circuitry being configured to:
cause the target AMF to:
obtain an indication that a terminal device has determined to shift from accessing a first service using a current network slice to accessing a second service using a target network slice, network access to the current network slice being handled by another source AMF currently serving the terminal device, and network access to the target network slice being handled by the target AMF;
obtain, as an output from a slice authentication procedure, a mutual secret that is shared between the terminal device and the target AMF, the slice authentication procedure having been performed with the terminal device; and
activate a created security context for the target network slice based on the mutual secret, thereby security isolating the target network slice from the source AMF.

* * * * *